United States Patent [19]

Lloyd

[11] Patent Number: 4,664,751
[45] Date of Patent: May 12, 1987

[54] DE-SALINATOR FOR BRACKISH SALT WATER

[75] Inventor: Ian D. Lloyd, Wynnum, Australia

[73] Assignee: Nautical Services Pty. Ltd., Wynnum, Australia

[21] Appl. No.: 762,813

[22] PCT Filed: Apr. 27, 1982

[86] PCT No.: PCT/AU83/00048
§ 371 Date: Dec. 27, 1983
§ 102(e) Date: Dec. 27, 1983

[87] PCT Pub. No.: WO83/03821
PCT Pub. Date: Nov. 10, 1983

Related U.S. Application Data

[63] Continuation of Ser. No. 571,541, Dec. 27, 1983, abandoned.

[30] Foreign Application Priority Data

Apr. 27, 1982 [AU] Australia ............................ PF3754

[51] Int. Cl.⁴ .............................................. B01D 3/10
[52] U.S. Cl. ..................................... 202/176; 202/180; 202/181; 202/197; 202/205; 202/235; 202/185 R; 203/11; 203/40; 203/91; 203/DIG. 14; 203/DIG. 17; 159/DIG. 40
[58] Field of Search ........ 202/176, 180, 181, 194–197, 202/264, 236, 235, 205, 185.1; 203/10, 11, 100, 90, 91, 12, DIG. 14, 20, 40, DIG. 17; 159/DIG. 40

[56] References Cited

U.S. PATENT DOCUMENTS

| | | | |
|---|---|---|---|
| 2,078,377 | 4/1937 | Fox et al. | 203/11 |
| 2,643,974 | 6/1953 | Impagliazzo | 203/10 |
| 3,248,305 | 4/1966 | Williamson | 202/205 |
| 3,725,206 | 4/1973 | Foley | 202/205 |
| 3,796,640 | 3/1974 | Boomer | 202/205 |
| 3,864,215 | 2/1975 | Arnold | 203/11 |
| 4,118,283 | 10/1978 | Diggs . | |
| 4,318,781 | 3/1982 | Iida . | |

FOREIGN PATENT DOCUMENTS

| | | | |
|---|---|---|---|
| 417437 | 7/1969 | Australia . | |
| 431422 | 1/1970 | Australia . | |
| 456146 | 3/1972 | Australia . | |
| 33928/71 | 4/1973 | Australia . | |
| 462145 | 4/1973 | Australia . | |
| 0006030 | 3/1979 | Japan | 202/185 R |
| 716603 | 10/1954 | United Kingdom . | |
| 939188 | 10/1963 | United Kingdom . | |
| 1568604 | 6/1980 | United Kingdom | 203/10 |

Primary Examiner—S. Leon Bashore
Assistant Examiner—V. Manoharan
Attorney, Agent, or Firm—Larson and Taylor

[57] ABSTRACT

A de-salinator 10 for brackish- or salt-water has a heat insulating shell 11 closed by end plates 12. A heat exchanger 22 in the bottom of the chamber 13 is heated by engine coolant from a marine engine 27, while a pair of condensor coils 19, connected to manifolds 33, 34, use sea water to cool the fresh water vapour which is drawn off by outlets 21. The engine driven pump 37 which draws the water through the condensor coils 19 operates an eductor 36 which generates a partial vacuum in the chamber 13, drawing off brine from the bottom of the chamber and any excess water in the chamber. The level of water in the chamber 13 is maintained by drawing off a portion of the heated water passing through the condensor tubes 19. The condensate is drawn from the outlets 21 via an eductor 46 which is driven by a suction pump 45 connected to the fresh water tank 47.

8 Claims, 3 Drawing Figures

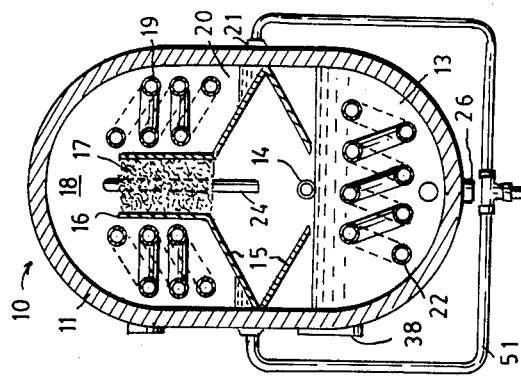
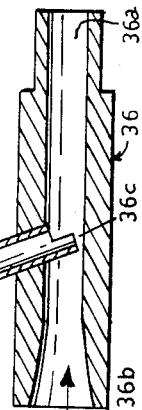
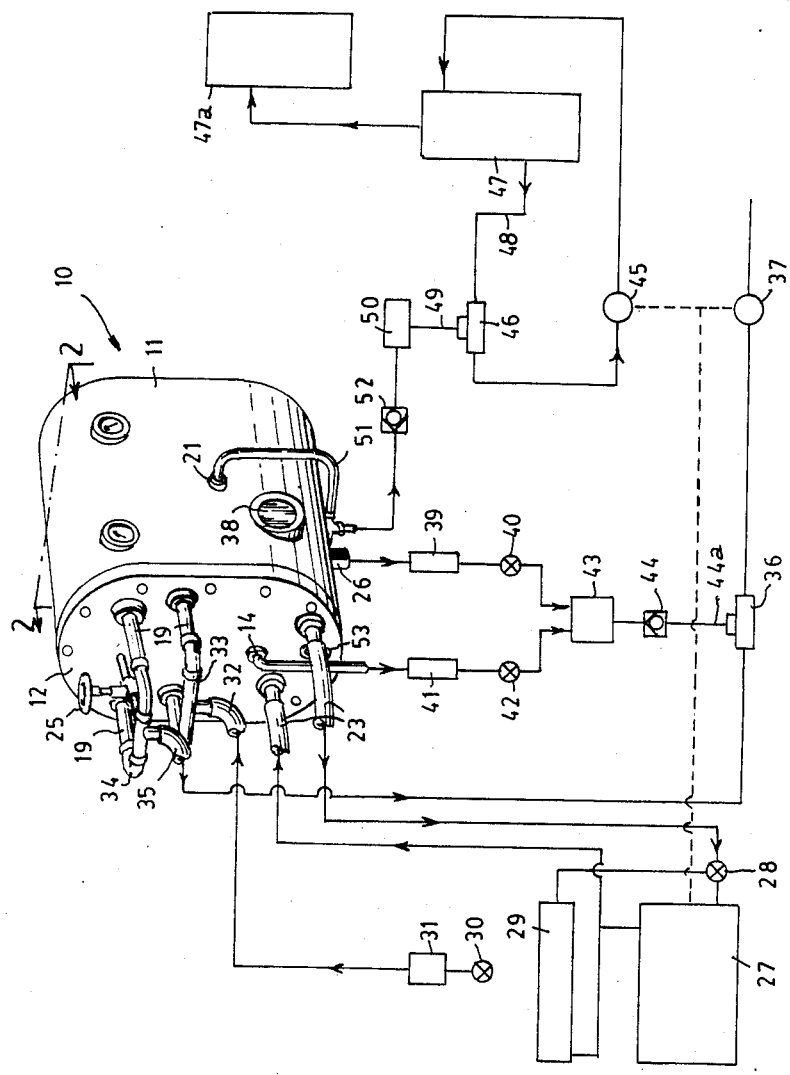

DE-SALINATOR FOR BRACKISH SALT WATER

This application is a continuation of application Ser. No. 571,541, filed Dec. 27, 1983, now abandoned.

BACKGROUND OF THE INVENTION (1.) Field of the Invention

This invention relates to a de-salinator for brackish- or salt-water which is particularly useful for, but not limited to, marine applications.

(2.) Brief Description of the Prior Art

The marine de-salinators presently available have a number of problem areas. Firstly, they use electric pressure pumps to operate the eductors. These pumps require generators and/or alternators driven by the main and/or auxiliary engines of the watercraft for their power. As the engines must operate at, e.g. 3000 rpm to provide sufficient power, fuel is wasted when the engines are run at those speeds solely to generate electricity for the pumps. Secondly, the pumps drive the eductors under pressure and bypass valves must be provided in an attempt to maintain the pressures in the eductors at a substantially constant value, therefore maintaining the condensation production rate at a constant. Thirdly, the "still"-type de-salinators require regular descaling and have a low output of fresh water while the osmosis-type require careful operation on startup to prevent membrane damage.

BRIEF SUMMARY OF THE PRESENT INVENTION

It is an object of the present invention to provide a de-salinator which avoids the need for generators and/or alternators to power the pumps.

It is a preferred object to provide a de-salinator which can be operated over the full operating range of the engine(s).

It is a further preferred object to provide a de-salinator where the eductors are powered by suction pumps which prevent overloading of the eductors.

It is a still further preferred object to provide a de-salinator which will operate at relative low heating temperatures.

It is a still further preferred object to provide a de-salinator where the de-salinator chamber is manufactured from fibreglass or other suitable plastics material.

Other preferred objects will become apparent from the following description.

In one aspect, the invention resides in a de-salinator for brackish- or salt-water of the type including:

a de-salination chamber;

a heat exchanger in the lower portion of the chamber to boil the brackish or salt-water;

at least one condensor coil in the upper portion of the chamber to condense the de-salinated water vapour generated by the boiling water;

at least one baffle between the heat exchanger and the condensor coils; and at least one outlet for the condensed de-salinated water from the chamber, wherein:

the condensor coil or coils are cooled by the water drawn from the supply of the brackish- or salt-water by a suction pump, and the water from the condensor coil or coils is drawn through an eductor which is connected to the chamber to produce at least a partial vacuum in the chamber.

Preferably a second eductor, powered by a second suction pump, is provided to draw off the desalinated water from the chamber. Preferably the suction pump draws fresh water from a fresh water tank, in which the de-salinated water is stored, to power the eductor.

Preferably the first eductor also draws off concentrated brine from the bottom of the de-salination chamber.

Preferably the first eductor is also connected to the overflow outlet for the chamber to draw off any excess water in the chamber.

Preferably, when the engine driving the suction pumps is switched off, air is bled into the chamber to return it to atmospheric pressure.

Preferably the heat exchanger receives hot water from the engine driving the suction pumps, or from a solar heat water collector.

Preferably a portion of the brackish water or salt-water, after it has been heated in the condensor coils, is fed into the de-salination chamber to maintain the water level in the chamber at a desired level.

BRIEF DESCRIPTION OF THE DRAWINGS

To enable the invention to be fully understood, a preferred embodiment will now be described with reference to the accompanying drawings, in which:

FIG. 1 is a perspective front view of the de-salination chamber and a schematic view of the associated circuit for a marine application;

FIG. 2 is a sectional end view of the chamber, taken on line 2—2 on FIG. 1; and

FIG. 3 is a sectional side view of an eductor suitable for the invention.

DETAILED DESCRIPTION OF THE PREFERRED EMBODIMENT

The de-salination chamber 10 has a substantially elliptical shell 11 closed at each end by removable end plates 12, the shell and end plates being formed from fibreglass. An O-ring is provided in a groove around each end of the shell to seal the end plates to the shell and self-tapping fasteners secure the end plates to the shell.

The bottom portion of the chamber provides a container for the brackish- or salt-water 13 to be treated, the level of the water being limited by an overflow outlet 14.

Inclined baffles 15 lead up to a pair of spaced vertical baffles 16 with a central mesh screen 17 which prevents froth entering the condensation chamber 18 in the upper portion of the de-salinator.

At the top of the condensation chamber 18, the vapour is condensed on a pair of condensing tubes 19 provided sinuously along each side of the condensation chamber 18. The condensation runs down the sides of the shell 11 or the upper faces of the baffles 15 to condensate collection chambers 20, from which the condensate can be drawn off via condensate outlets 21.

A heat exchanger 22, comprising sinuous copper pipes, is provided in the bottom of the de-salinator 10 and is connected to a source of hot water by hot water pipes 23.

A spray nozzle 24 is connected to the outlet side of the condensing tubes 19 via a valve 25 which enables a portion of the hot brackish- or salt-water to be sprayed into the de-salination chamber to maintain the volume of brackish- or salt-water 13 at a desired level. Concentrated brine is drawn off from the bottom of the de-salinator via a brine outlet 26.

The operation of the de-salinator will now be described.

Hot water, e.g. at a temperature of 32° C. or greater, is pumped from the cooling system of the main engine 27 through the heat exchanger 22 via hot water pipes 23. At temperatures greater than 85° C., a thermostatically controlled valve 28 bypasses a portion of the water through a marine heat exchanger 29 before returning the now-cooled water to the engine 27 to to prevent overheating.

Salt-water is sucked from the sea through a sea cock 30 and filter 31 and passes through an inlet pipe 32 to a manifold 33 which distributes the incoming water to the condensing tubes 19. The nowheated salt-water enters an exhaust manifold 34 and flows through an outlet pipe 35 to an eductor 36 which has its outlet connected to an engine-driven suction pump 37. The outlet from the pump returns the heated salt-water to the sea. A portion of the hot salt water flows from the manifold 34 through the valve 25 to the spray nozzle 24 to maintain the level of the salt-water 13 at a predetermined level. A sight glass 38 in the shell (or in one of the end plates 12) enables the level to be checked.

The inlet of the eductor 36 is connected to the brine outlet 26 via a flow glass 39 and scavenge valve 40, to draw off any concentrated brine in the de-salinator, and to the overflow outlet 14 via a flow glass 41 and overflow valve 42. A balance distributor 43 and check valve 44 upstream of the inlet to the eductor 36 maintains the desired flow from the brine outlet 26 and overflow outlet 14 to the eductor 36. The vacuum generated by the eductor 36 reduces the pressure in the de-salinator to lower the boiling temperature for the salt-water 13. The reduced pressure in the desalinator enables the water 13 to be boiled at a temperature of, for example 32° C.

Referring to FIG. 3, the eductor 36 has a main body with a central bore 36a having an initial construction 36b. The line 44a connected to the check valve 44 enters the body at an angle and the construction 36c formed in the bore generates a vacuum due to the flow of water through the construction.

A second engine driven suction pump 45, driven off a common shaft with the suction pump 37, draws water through a second eductor 46 from the fresh water tank 47. The water line 48 interconnecting the water tank 47 to the eductor 46 is spaced above the bottom of the tank to ensure a reserve supply of water is contained in the tank 47. The inlet of the eductor 46 is connected to the condensate outlets 21 via a fresh water line 49, fitted with a salinity monitor 50, and a manifold 51. A check valve 52 prevents the fresh water from the tank 47 being drawn into the desalinator when the pump 45 is switched off. Water from the tank 47 may be fed to a reservoir 47a which provides additional storage capacity.

The heat exchanger 22 boils the salt-water 13 and vapour rises up into the condensation chamber 18 where it condenses on the condensing tubes 19. The mesh screen 17 traps any froth in the vapour and prevents it from entering the condensation chamber. The fresh water drips and runs into the condensate collection chambers 20, while the concentrated brine which remains drips back into the lower portion of the desalinator and drawn off by the brine outlet 26.

The eductor 36, which produces the partial vacuum in the de-salinator, also draws off any excess water 13 in the de-salinator via the overflow outlet 14.

Check valve 44 is provided intermediate the outlets 26, 14 and the eductor 36 and this may be controlled by a diaphragm valve on the output side of the pump 37. When the engine 30 is switched off, the pressure on the downstream of the pump 37 drops and the diaphragm valve closes the check valves 44 to prevent the brine and salt water being sucked back into the desalinator.

The check valve 44 may also include an air bypass which operates to allow air into the de-salinator, and so destroy the vacuum in the de-salinator, when the valve is closed when the engine is switched off. This means that the de-salinator is evacuated each time the engine is operated and the de-salinator is returned to atmospheric pressure when the engine is switched off.

The de-salinator provides a simple and efficient means for de-salinating salt-water or brackish water and its efficiency as a heat exchanger means that the marine heat exchanger 29 is only necessary for large capacity engines.

Releasable connectors between the lines and the pipes on the de-salinator and the removable end plates 12 enable any repairs or maintenance to the de-salinator to be effected simply and quickly while the elimination of the electric pumps removes a number of potential problem areas. A removable plug 53 in one of the end plates 12 enables acid to be placed in the de-salinator, when not in use, to descale the heat exchanger pipes 22.

Whilst a marine application has been specifically described, the unit may be used in, for example, desert areas to purify brackish water and the hot water for the heat exchanger 22 may be provided by solar hot water collectors while the pumps may be driven by a steam motor (the steam being generated in a solar collector) or by electric motors powered by solar electricity-generating arrays or panels.

Various changes and modifications may be made to the embodiment described and illustrated without departing from the scope of the present invention.

I claim:

1. A de-salinator for brackish- or salt-water including:
   a de-salinator chamber;
   a heat exchanger in a lower portion of the chamber to boil brackish- or salt-water from a supply of said water;
   at least one condensor coil in an upper portion of the chamber to condense the water vapor generated by the boiling water;
   at least one baffle between the heat exchanger and the at least one condensor coil;
   at least one outlet for the condensed water from the chamber;
   a first suction pump for drawing off water from the supply of the brackish- or salt-water and supplying said water to the at least one condensor coil for cooling thereof, and
   a first eductor through which the water from the at least one coil is drawn, said first eductor being interposed between the at least one condensor coil and said suction pump and being connected to the chamber to produce at least a partial vacuum in the chamber, and
   a second eductor, powered by a second suction pump, for drawing off the de-salinated water from the chamber, the second suction pump drawing fresh water from a fresh water storage tank in which the de-salinated water is stored, to power the second eductor.

2. A de-salinator for brackish- or salt-water including:

a de-salinator chamber;

a heat exchanger in a lower portion of the chamber to boil brackish- or salt-water from a supply of said water;

at least one condensor coil in an upper portion of the chamber to condense the water vapor generated by the boiling water;

at least one baffle between the heat exchanger and the at least one condensor coil;

at least one outlet for the condensed water from the chamber;

a suction pump for drawing off water from the supply of the brackish- or salt-water and supplying said water to the at least one condensor coil for cooling thereof;

an eductor through which the brackish- or salt-water from the at least one condensor coil is drawn, said eductor being interposed between the at least one condensor coil and said suction pump and being connected to the chamber to produce at least a partial vacuum in the chamber;

said eductor also connected to a brine outlet at the bottom of the chamber to draw off concentrated brine from the chamber and to an overflow outlet for the chamber to draw off any excess brackish- or salt-water in the chamber.

3. A de-salinator for brackish- or salt-water including:

a de-salinator chamber;

a heat exchanger in a lower portion of the chamber to boil brackish- or salt-water from a supply of said water;

at least one condensor coil in an upper portion of the chamber to condense the water vapor generated by the boiling water;

at least one baffle between the heat exchanger and the at least one condensor coil;

at least one outlet for the condensed water from the chamber;

a first suction pump for drawing off water from the supply of the brackish- or salt-water and supplying said water to the at least one condensor coil for cooling thereof, and a first eductor through which the water from the at least one coil is drawn, said eductor being interposed between the at least one condensor coil and said suction pump and being connected to the chamber to produce at least a partial vacuum in the chamber;

a second suction pump connected to said chamber for drawing off de-salinated water therefrom; and a second eductor connected between said second pump and said chamber;

said first and second pumps including a common shaft driven by an engine.

4. A de-salinator as claimed in claim 1 further comprising:

an engine for driving at least one of said suction pumps and for providing hot water which is received by the heat exchanger.

5. A de-salinator as claimed in claim 1 wherein:

means, including a valve, are provided for maintaining a water level in the desalination chamber.

6. A de-salinator as claimed in claim 1 wherein:

a pair of condensor coils are provided in the chamber above a respective condensate chamber along the junction of the baffles with the chamber walls, the inlet and outlets of the coils being connected to respective inlet and outlet manifolds.

7. A de-salinator as claimed in claim 1 wherein:

the walls of the chamber comprise heat insulating material to limit the loss of heat from the chamber.

8. A de-salinator as claimed in claim 3 wherein said first eductor comprises a main body including a central bore having a constriction therein and an inlet line arranged at an angle to the body.

* * * * *

UNITED STATES PATENT AND TRADEMARK OFFICE
CERTIFICATE OF CORRECTION

PATENT NO. : 4,664,751
DATED      : May 12, 1987
INVENTOR(S) : LLOYD, Ian D.

It is certified that error appears in the above—identified patent and that said Letters Patent is hereby corrected as shown below:

In the title the word "or" was omitted. The corrected title should read "DESALINATOR FOR BRACKISH OR SALT WATER".

Signed and Sealed this

Seventeenth Day of November, 1987

*Attest:*

DONALD J. QUIGG

*Attesting Officer*     *Commissioner of Patents and Trademarks*